J. L. HAYWARD
Nut-Lock.

No. 202,723.  Patented April 23, 1878.

WITNESSES:
Francis McArdle.
C. Sedgwick

INVENTOR:
J. L. Hayward
BY Munn &Co
ATTORNEYS.

UNITED STATES PATENT OFFICE.

JACOB LYMAN HAYWARD, OF SOUTH FRAMINGHAM, MASSACHUSETTS.

IMPROVEMENT IN NUT-LOCKS.

Specification forming part of Letters Patent No. 202,723, dated April 23, 1878; application filed March 27, 1878.

*To all whom it may concern:*

Figure 1:
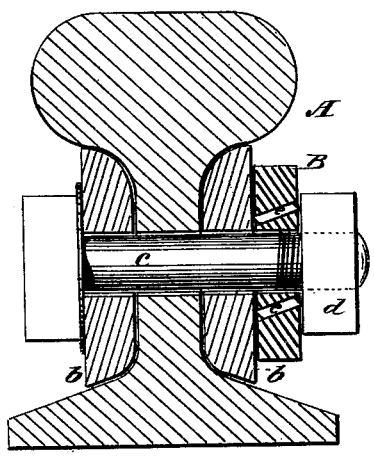
Figure 2:
Figure 3:
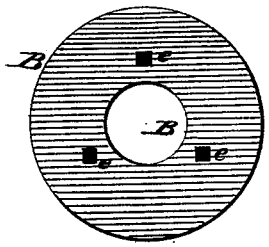

Be it known that I, JACOB L. HAYWARD, of South Framingham, in the county of Middlesex and State of Massachusetts, have invented a new and Improved Nut-Lock, of which the following is a specification:

Figure 1 is a transverse section of a rail-joint, showing the application of my improved nut-lock. Fig. 2 is a diametrical section of the washer. Fig. 3 is a side elevation of the elastic washer.

The object of my invention is to provide a cheap and reliable device for locking the nuts of bolts which are subject to jarring and are liable to become loosened.

The invention consists of a thick washer formed of elastic rubber and containing several steel pins which are parallel with the axis of the washer, which, when the washer is compressed by the nut, act as pawls in preventing the nut from unscrewing.

In the drawing, A is a railroad-rail; $b\ b$, joint-plates, and $c$ the bolt for clamping the joint-plates to the rail. Between the nut $d$ and the joint-plate there is a rubber washer, B, into which are inserted several tempered-steel pins, $e$, which are parallel with the axis of the washer when it is not pressed by the nut; but when the nut is screwed down upon the washer the steel pins become inclined in the direction in which the nut is turned.

The rubber, acting as a spring, forces the pins into contact with the joint-plate and the nut, and the pins, acting as pawls, prevent the unscrewing of the nut by engaging the surface of the nut and joint-plate.

Where a washer of this description is employed in locking a nut, it is difficult, if not impossible, to unscrew it without destroying the washer.

Having thus described my invention, I claim as new and desire to secure by Letters Patent—

A nut-lock consisting of an elastic washer having steel pins extending through it parallel with its axis, substantially as herein shown and described.

JACOB LYMAN HAYWARD.

Witnesses:
   CHAS. S. GOWEN,
   JULES BIENCHAUD.